(12) United States Patent
Pryakhin et al.

(10) Patent No.: US 9,436,702 B2
(45) Date of Patent: Sep. 6, 2016

(54) NAVIGATION SYSTEM DATA BASE SYSTEM

(75) Inventors: Alexey Pryakhin, Munich (DE); Peter Kunath, Munich (DE); Juergen Welscher, Markt Schwaben (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 451 days.

(21) Appl. No.: 13/402,539

(22) Filed: Feb. 22, 2012

(65) Prior Publication Data
US 2012/0215806 A1 Aug. 23, 2012

(30) Foreign Application Priority Data

Feb. 23, 2011 (EP) ..................................... 11155710

(51) Int. Cl.
G06F 17/30 (2006.01)

(52) U.S. Cl.
CPC ... G06F 17/30241 (2013.01); G06F 17/30327 (2013.01); G06F 17/30625 (2013.01)

(58) Field of Classification Search
CPC ................... G06F 17/30684; G06F 17/30625; G06F 17/30327
See application file for complete search history.

(56) References Cited

U.S. PATENT DOCUMENTS

| | | | | |
|---|---|---|---|---|
| 5,778,405 A | * | 7/1998 | Ogawa .............. | G06F 17/30625 707/999.003 |
| 8,326,826 B1 | * | 12/2012 | Upstill et al. ................. | 707/723 |
| 2002/0002550 A1 | * | 1/2002 | Berman ............................ | 707/3 |
| 2004/0111214 A1 | | 6/2004 | Buecher et al. .............. | 701/209 |
| 2006/0265422 A1 | * | 11/2006 | Ando et al. ................. | 707/104.1 |
| 2007/0198597 A1 | * | 8/2007 | Betz .................. | G06F 17/30533 |
| 2007/0198951 A1 | * | 8/2007 | Frank .............................. | 715/838 |
| 2008/0270142 A1 | * | 10/2008 | Srinivasan et al. ......... | 704/270.1 |
| 2009/0037399 A1 | * | 2/2009 | Bartz et al. ........................ | 707/5 |
| 2012/0059786 A1 | * | 3/2012 | Kammergruber ........ | G06N 5/02 706/50 |

OTHER PUBLICATIONS

Ciaccia, M-tree: An Efficient Access Method for Similarity Search in Metric Spaces, 1997, pp. 1-10.*
Trania, Slim-trees: High Performance Metric Trees Minimizing Overlap Between Nodes, Oct. 1999, pp. 1-20.*
Hadzic, Critique Graphs for Catalogue Navigation, 2008, pp. 115-122.*
Bawa, LSH Forest: SelfTuning Indexes for Similarity Search, 2005, pp. 651-660.*
Random House Kernerman Webster's College Dictionary, 2010, 1 page.*
Extended European Search Report issued in European Patent Application No. 11155710.4, dated Nov. 15, 2011 (9 pgs.).
Bartolini, I., Ciaccia, P., Patella, M., "String Matching with Metric Trees Using an Approximate Distance," In "String Processing and Information Retrieval," Jan. 1, 2002, XP55011276, ISBN: 978-3-54-044158-8, vol. 2476, pp. 271-283; © Springer-Verlag Berlin Heidelberg 2002.

(Continued)

Primary Examiner — Albert Phillips, III
(74) Attorney, Agent, or Firm — Artegis Law Group, LLP

(57) ABSTRACT

A system for performing a similarity search in a navigation device data base uses a metric index structure. The index structure includes a plurality of nodes. When a query object is received, a node of the index structure which is associated with at least one object is accessed. A distance between the query object and the at least one object is determined in accordance with a distance metric. Based on the determined distance, another node of the index structure is selectively accessed.

19 Claims, 7 Drawing Sheets

(56) References Cited

OTHER PUBLICATIONS

Traina, C., Traina, A., Faloutsos, C., Seeger, B., "Fast Indexing and Visualization of Metric Data Sets Using Slim-Trees," IEEE Transactions on Knowledge and Data Engineering, IEEE Service Center, Los Alamitos, CA, US; vol. 14, No. 2, Mar. 1, 2002; XP011094290, ISSN: 1041-4347, DOI: 10.1109/69.991715, pp. 244-260, © 2002 IEEE.

Cenk Sahinalp, S., Tasan, M., Macker, J., Meral Ozsoyoglu, Z., "Distance Based Indexing for String Proximity Search," Proceedings of the $19^{th}$ International Conference on Data Engineering (ICDE 2003), Bangalore, India, Mar. 5-8, 2003, vol. Conf. 19, Mar. 5, 2003, XP010678734, DOI: 10.1109/ICDE.2003.1260787, ISBN: 978-0-7803-7665-6, pp. 125-136; © 2003 IEEE.

\* cited by examiner $O_r$ ; $ptr(T(O_r))$ ; $d(O_r;P(O_r))$ ; $r(O_r)$ — 31

$O_1$ ; $d(O_1;P(O_1))$ — 32

NAVIGATION SYSTEM DATA BASE SYSTEM

PRIORITY CLAIM

This application claims the benefit of priority from European Patent Application No. 11 155 710.4 filed Feb. 22, 2012, which is incorporated by reference.

BACKGROUND OF THE INVENTION

1. Technical Field

The invention relates to data base search methods and devices for use in navigation systems. The invention relates in particular to a method of searching a navigation system data base using an index structure, to a navigation system and to a method of generating an index structure.

2. Related Art

Navigation devices are known which perform functions such as route searches between two locations. Modern navigation devices also may provide additional functionalities, such as serving as a travel guide that output, upon demand, information on points of interest (POI). Such information may include names of streets or POIs, but may also include additional textual or multimedia information. For example, some navigation devices may include travel guide functionalities to output detailed explanations, in textual and/or multimedia form, on objects.

SUMMARY

The database system provides methods and navigation devices which allow a fault-tolerant search to be carried out. In addition, the system provides methods and navigation devices which allow a fault-tolerant search to be performed efficiently. According to an aspect of the database system, a method of performing a similarity search in a navigation device data base is provided. The similarity search may be performed using an index structure. The data base may include a number of objects and the index structure may include a number of nodes. A query object may be received. A node of the index structure which is associated with at least one object of the objects included in the data base may be accessed. For the at least one object of the accessed node, a distance between the query object and the object may be determined in accordance with a distance metric. Based on the determined distances, another node of the index structure may be selectively accessed.

The data base system may use a similarity search. This allows a fuzzy search to be implemented that not only provides information on exact matches, but also retrieves information on the most similar objects in the data base. In one example, distances between the query object and objects in a node of the index structure may be determined to identify which other node(s) are to be accessed. This allows the data base system to perform the search efficiently. The data base system may avoid accessing nodes which neither include nor point to objects having a distance from the query object that is greater than a threshold. By using a distance determined in accordance with a distance metric, the database system may quantitatively evaluate the similarity or dissimilarity between the query object and objects included in the index structure.

The index structure may be stored in a storage device of the navigation device. The index structure may be a metric index structure. A metric index structure is an index which considers relative distances between objects rather than their coordinates in a multi-dimensional space to partition the index. In one example, the data base system only considers relative distances between objects. The index structure may be an M-tree, a vantage-point tree or any other tree structure organized in accordance with a distance metric. The index structure may be organized in accordance with a distance function which is substantially similar to the distance used in determining the distance between the query object and objects in performing the search.

A "distance metric" or "metric" as used herein refers to a distance function which fulfils the postulates of reflexivity, symmetry and triangle inequality. In addition, the term "similarity search" is used herein to refer to a search for objects which fulfill a predetermined criterion with regard to similarity or dissimilarity relative to a query object. Examples include the search for objects having a dissimilarity, measured as distance according to the distance metric, which is less than a fixed threshold, or the search for objects having the smallest dissimilarity, measured as distance according to the distance metric, from the query object among the indexed objects.

It is possible, but not required to determine the exact distance between the query object and all objects represented by a node visited in the search. For at least some of the nodes along a path through the index structure, it may be sufficient to determine a lower bound on the distance between the query object and the respective object in the index structure.

The objects may be strings, in particular phoneme strings or textual strings. Correspondingly, the query object may be a phoneme string or textual string. This allows a fault-tolerant search for phoneme strings or textual strings to be performed. Such a search may be useful when inputting starting and destination locations, when searching in data bases for POIs, when searching through textual or multimedia data stored in the data base, or similar.

The distance metric for objects which are strings may be selected from any one of a plurality of string metrics available. For example, the distance metric may be based on a Levenshtein distance. The distance function may also be any one of a Damerau-Levenshtein distance, a Jaro-Winkler distance, a Hamming distance, a distance determined in accordance with the Soundex distance metric, a Needleman-Wunsch distance, a Gotoh distance, a Smith-Waterman-Gotoh distance, a $L_p$ distance with $p \geq 1$ or any other string metric which complies with the postulates of reflexivity, symmetry and triangle inequality, or any other distance metric.

A text input may be received, and a text-to-phoneme conversion may be performed to generate the query object from the text input. Alternatively or additionally, the query object may be a phoneme string generated from a voice input.

The index structure may further include a distance information on distances between the at least one object included in the accessed node and other objects in the index structure. The distance information may include, for any node which has a parent object, a distance between the object in the node and its parent object. This distance information may be stored in the index structure. Alternatively or additionally, for any object which points to another node, i.e., which is not in a leaf node, the distance information may include an upper bound on the distance between the object and any object included in the sub-tree of the index structure associated with this object. This upper bound for distances may also be referred to as coverage radius, for it represents the distance around the object in which all objects in its sub-tree are located. By including such distance information in the index structure, the distance information can be used at run-time without requiring it to be computed during the similarity search. Search performance can thus be enhanced.

The accessing of another node may be selectively performed based on the distance between the query object and the object included in the accessed node and based on the distance information. A threshold comparison may be performed. Based on the threshold comparison, it may be determined whether a sub-tree of the search index must be searched or not. Alternatively or additionally, based on a threshold comparison, it may be determined whether it is required to compute the exact distance between the query object and an object in the index structure.

The distance between the query object and the object included in the node may be compared to a sum of the coverage radius and a search radius. If the threshold comparison shows that the distance between the query object and the object included in the node is greater than the sum, it is not required to access the sub-tree of the index structure to which the object points. The search radius may be fixed or may be made to vary as the similarity search progresses.

The node may include several objects. The index structure may include, for each one of the several objects, an upper bound on a distance between the respective object and any object included in a sub-tree of the index structure to which the respective object points.

Objects may be selectively pruned from the similarity search based on the determined distance. Pruning may be performed based on the determined distances between the query object and objects in a node and based on the coverage radii of objects.

The steps of determining a distance and selectively accessing another node may be repeated iteratively. When these steps are repeated, it may not be required that the distance between a query object and objects included in the node is computed for each one of the objects in the node. Instead, the distance between a query object and objects included in the node may be selectively computed based on a criterion, the criterion being such that it does not require a new distance to be computed. The steps of determining a distance and selectively accessing another node may be terminated when the other node is a leaf node of the index structure.

When the accessed other node is a leaf node, the method may further include selectively determining a distance between an object in the leaf node and the query object based upon a result of a threshold comparison. The distance between a given object in the leaf node and the query object may be determined selectively based upon a result of the threshold comparison. The threshold comparison may include comparing a modulus of a difference between a first distance and a second distance to a threshold. The first distance may be a distance between the query object and a parent object of the leaf node. The second distance may be a distance between the parent object of the leaf node and the respective given object in the leaf node. For any given object in the leaf node, the distance between the respective given object and the query object may be selectively computed based upon a result of such a threshold comparison. Thereby, search time may be further reduced.

In the search, all objects located within a pre-determined distance from the query object may be identified. The distance may be defined in accordance with a distance metric. This allows all objects to be identified and output to the user which have a dissimilarity to the query object, and are within a predetermined threshold distance.

Alternatively or additionally, an integer number k>1 of objects may be identified which represent the k nearest neighbours, determined in accordance with the distance metric, of the query object in the index structure. This allows the k objects to be identified and output to the user which are most similar, in terms of the distance metric, to the query object.

The identified objects may be output based on a distance between the query object and the respective identified object. When outputting the identified objects, the objects may be sorted in accordance with the distance between the query object and the respectively identified object. For example, when outputting via an optical output unit, such as a display, the object having the smallest distance from the query object may be output at a top or left-most position, and the other objects may be output in order of increasing distance from the query object. In another example, when outputting via an audio output unit, which includes a loudspeaker or other sound producing device, the object having the smallest distance from the query object may be output first, and the other objects may be sequentially output in order of increasing distance from the query object thereafter.

According to another aspect, the data base system may include a navigation device. The navigation device includes a storage device and a processing device. The storage device stores an index structure for a data base that includes a number of objects, and a number of nodes. The processing device is coupled to the storage device. In order to perform a similarity search for a query object, the processing device is configured to access a node of the index structure associated with at least one object. The processing device is further configured to determine a distance between the query object and the at least one object in accordance with a distance metric. The processing device is further configured to selectively access another node of the index structure based on the determined distance.

Such a navigation device allows a fuzzy search to be implemented that not only provides information on exact matches, but also retrieves information on the most similar objects in the data base. In one example, distances between the query object and objects in a node of the index structure may be determined to identify which other node(s) are to be accessed. This allows the data base system to perform the search efficiently. The data base system may avoid accessing nodes which neither include nor point to objects having a distance from the query object that is greater than a threshold. By using a distance determined in accordance with a distance metric, the database system may quantitatively evaluate the similarity or dissimilarity between the query object and objects included in the index structure. The objects may be phoneme and/or textual strings, and the index structure may be a metric index structure, as previously discussed.

The navigation device may include an input unit. The processing device may be coupled to the input unit to receive the query object from the input unit, or to generate the query object based on an input received at the input unit. The processing device may be configured to perform a text-to-phoneme conversion to generate the query object.

In addition, the navigation device may include an output unit. The processing device may be configured to control the output unit such that plural objects found in the similarity search are output via the output unit. The processing device may be configured to control the output unit such that the output objects are sorted in accordance with the distance between the query object and the respective output object.

The processing device may be configured perform the similarity search, and to identify all objects having a distance of less than a fixed search radius from the query object. The objects may be identified in accordance with the distance metric. The processing device may alternatively or additionally be configured to identify the k>1 objects which are the k nearest neighbours of the query object.

According to another aspect, the system may include a method of generating a metric index structure for a navigation device data base. The data base includes a number of objects. In the method, directory nodes of the index structure which include pointers to other nodes of the index structure and leaf nodes of the index structure may be generated by the processing device. Generating the nodes may include respectively determining, for plural pairs of objects, a distance between the objects of the pair of objects to thereby determine plural distances. The distances are respectively determined in accordance with a distance metric. Based on the plural distances, objects are identified which can be included in a directory node, and objects are identified which can be included in a leaf node.

Using this method, an index structure is generated which can be used in the data base system to perform a similarity search. The generated metric index structure may be organized in accordance with the determined plural distances. The determined plural distances are relative distances between objects. This allows the metric index structure to be set up also for objects which are not defined by coordinates in a multi-dimensional space.

When generating the index structure, the distance metric may be selected from any one of a plurality of distance definitions for a string metric, as previously discussed. The method may include storing, for an object which is included in a directory node, a predetermined upper bound on the distances between the respective object and any object included in a sub-tree of the index structure to which the object points. This upper bound, or coverage radius, may be stored in the index structure. The method may alternatively or additionally include storing, for an object which is included in a node that has a parent object, a distance between the respective object and its parent object.

In the method, the index structure may be grown in an iterative fashion. The method may include inserting additional objects into nodes. To this end, a node may be identified in which the object is to be inserted. Identifying the node may include determining the distance between the object to be inserted and objects in directory nodes of the index structure.

The method may further include splitting nodes. To this end, it may be determined whether, after insertion of the object, the number of objects in the node is greater than a fixed maximum number of objects. If the number exceeds a predetermined maximum number, the node is split. Splitting the node may include selecting objects from the node which are to be included in a new directory node and assigning objects to one of two new leaf nodes. Splitting the node may be done such that the overlap between the two coverage areas of the two objects in the new directory node is reduced to below a threshold or is minimized.

According to another aspect, the data base system may include a metric index structure for a navigation device data base. The metric index structure may include directory nodes which include pointers to other nodes of the index structure and leaf nodes. At least some of the nodes may include distance information representing information on a distance, determined according to a metric, between objects of the index structure. At least directory nodes may include an upper bound on the distances between objects in the directory node and any object included in a sub-tree of the index structure for the respective object.

It is to be understood that the features mentioned above and those to be explained below can be used not only in the respective combinations indicated, but also in other combinations or in isolation. In addition, other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

The foregoing and other features of embodiments will become more apparent from the following detailed description of embodiments when read in conjunction with the accompanying drawings. In the drawings, like reference numerals refer to like elements.

DETAILED DESCRIPTION OF THE PREFERRED EMBODIMENTS

Figure 1:
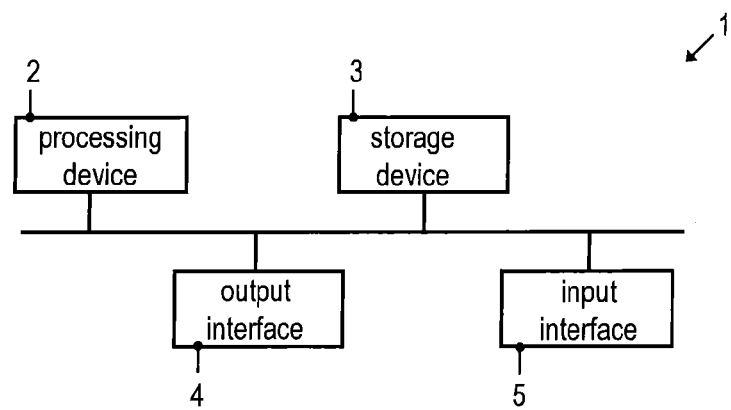
FIG. 1 is a schematic block diagram of an example navigation device.

FIG. 1 schematically illustrates an example vehicle navigation device 1 of the data base system. The navigation device 1 includes a processing device 2 controlling the operation of the navigation device 1, such as according to control instructions stored in a memory. The processing device 2 may comprise a central processing unit, for example in form of one or more microprocessors, digital signal processors or application-specific integrated circuits. The navigation device 1 further includes a storage device 3, which may be a volatile or non-volatile storage medium or memory. The storage device 3 may comprise any one, or any combination, of various types of storage or memory media, such as random access memory, flash memory or a hard drive, but also removable memories such as a compact disk (CD), a DVD, a memory card or the like. The storage device 3 may be tangible, and may be non-transitory in the aspect of not being a signal transmission medium.

The navigation device 1 may also include an output interface 4 for outputting information to a user. The output interface 4 may include an optical output device, an audio output device, or a combination of an optical output device and an audio output device. The navigation device 1 may also include an input interface 5 which allows a user to input information. In particular, the input interface 5 may allow a user to input textual information or voice information. Thus, the input interface 5 may include a touch screen, buttons, a keyboard, microphone, or any other device or system configured to receive a user input.

The navigation device 1 may include additional components, such as a position sensor and/or a wireless receiver and/or a vehicle interface. (not shown) The position sensor may be adapted to determine the current position of the vehicle in which the navigation device 1 is installed. The position sensor may comprise a GPS (Global Positioning System) sensor, a Galileo sensor, a position sensor based on mobile telecommunication networks or any other form of positioning system. The wireless receiver may be configured to receive information for updating the data base stored in the storage device 3. The vehicle interface may allow the processing device 2 to obtain information from other vehicle systems or vehicle status information via the vehicle interface. The vehicle interface may include a bus interface for communication via a bus protocol, for example CAN (controller area network) or MOST (Media Oriented devices Transport) interfaces.

The storage device 3 stores a data base comprising a plurality of objects. The plurality of objects may include textual or phoneme strings. For example, the data base may include objects which represent road names, objects which represent the names of points of interest (POI), and/or objects which represent additional information on roads or POIs. Such information may have the form, or may include, textual or phoneme strings or multimedia objects.

Due the size of the data bases used in the navigation device 1, it is a considerable challenge to perform a search in the data base. This applies in particular when a search is to be performed for textual strings, phoneme strings, multimedia objects or other objects which are not defined in a Euclidean space. The geometrical coordinates of objects defined in a 2D or 3D space may allow the objects to be indexed based on their coordinates for a coordinate-based search. Such an indexing is more challenging for objects such as textual strings, phoneme strings, multimedia objects or other objects which are not defined in a Euclidean space.

Further, when a search is performed for objects such as textual strings, phoneme strings or multimedia objects, the user may not only be interested in obtaining an exact hit. The user may rather be interested in obtaining information on search results that are similar to a query, but are not necessarily identical to it. For many applications, such as entering starting and destination locations, intermediate points or via points for a route search, or entering POIs, the user may not be aware of the correct textual representation of the name. Conventional techniques which search for exact matches in a data base in accordance with the first letters of a string may fail when there is a misspelling within these first letters.

Further, in a navigation device, constraints imposed by storage space restrictions and bounds on available computation time make it particularly challenging to implement an efficient search that is fault-tolerant.

The storage device 3 stores an index structure for the data base. In use of the navigation device 1, the processor 2 performs a similarity search using the index structure. The processor 2 may use an input received at the input interface 5 as query object or may perform additional operations on the input to generate a query object. The processor 2 may then perform a similarity search for the query object using the index structure. The similarity search involves computing distances between the query object and objects stored in the data base. The "computing" as used herein may be implemented in various ways, including look-up operations. The distance provides a quantitative measure for the dissimilarity of the query object and an object in the index structure. The one or more most similar objects found in the search may be output to the user via the output interface 4. For example, the processor 2 may generate a list on an optical output interface 4, such as a display, in which the objects in the index structure which have the smallest distance from the query object are listed in an order determined by their distances from the query object.

The index structure may be logically separate from the data base. Alternatively, the data base may be combined with the index structure, or components of the index structure may be included in the data base, and parts of the index structure may be external to the data base. The index structure may be implemented using any suitable indexing technology. As a none limiting example, the index structure may be implemented using SQ Lite. The index structure may be implemented as a user-defined index structure in the data base system, such as in a relational data base. The relational data base may include a table for text strings or phoneme strings, and another table for distances between pairs of text strings or pairs of phoneme strings.

The index structure for the data base may be organized as an index tree. The index structure may include a plurality of nodes, with at least some of the nodes being directory nodes which include pointers to other nodes, and with at least some other nodes being leaf nodes which do not include a pointer to other nodes. Each one of the nodes may be associated with at least one and typical several objects. A directory node may store, for the objects included in the directory node, a pointer to the root of the respective sub-tree associated with each one of these objects.

The index structure stored in the storage device 3 may be a metric index structure which can be searched using a distance metric. Further, the index structure may also be organized in accordance with the distance metric. For example, the index structure may be partitioned into sub-trees based on relative distances between the objects included in the data base, where the relative distances are determined in accordance with a distance metric.

As used herein, a "distance metric" or "metric" refers to a distance measure defined for objects of a non-empty set M which fulfills the following conditions:

Reflexivity (also referred to as identity of indiscernibles):

$$\forall x, y \in M : d(x,y) = 0 \text{ if and only if } x = y; \quad (1)$$

Symmetry:

$$\forall x, y \in M : d(x,y) = d(y,x) \quad (2)$$

Triangle inequality:

$$\forall x, y, z \in M : d(x,z) \leq d(x,y) + d(y,z) \quad (3)$$

When the above postulates (1)-(3) are fulfilled, it follows that the distance function also fulfills the positivity postulate:

$$\forall x, y \in M : d(x,y) \geq 0 \quad (4)$$

The tuple (M, d) of the set M and the metric d may also be referred to as metric space.

The metric according to which the index structure is organized and which is also used to perform the search in the index structure may be selected from a variety of definitions, depending inter alia on the objects in the data base. For example, for objects which are text strings or phoneme strings, the Levenshtein distance defines a metric and may be used both when building the index structure and when performing a similarity search in the index structure. The Levenshtein distance is also referred to as edit distance. The Levenshtein distance between two strings is defined as the minimum number of edits needed to transform one string into the other, with the allowable edit operations being insertion, deletion, or substitution of a single character. Other metrics may also be used to organize the index structure and to compute distances when performing a similarity search in the index structure.

Other metrics may be used. For example, the distance function may be selected to be any one of a Damerau-Levenshtein distance, a Jaro-Winkler distance, a Hamming distance, a distance determined in accordance with the Soundex distance metric, a Needleman-Wunsch distance, a Gotoh distance, a Smith-Waterman-Gotoh distance, a $L_p$ distance with $p \geq 1$ or any other string metric which complies with the postulates of reflexivity, symmetry and triangle inequality.

The index structure stored in the storage medium 3 may not only include objects and pointers to other nodes which define the search tree, but may additionally also include distance information which is indicative of distances between objects in the index structure. Such distance information may be retrieved from the index structure when performing a search. Such distance information may in particular be used to prune objects or nodes from the similarity search, as will be described in more detail below.

Figure 2:
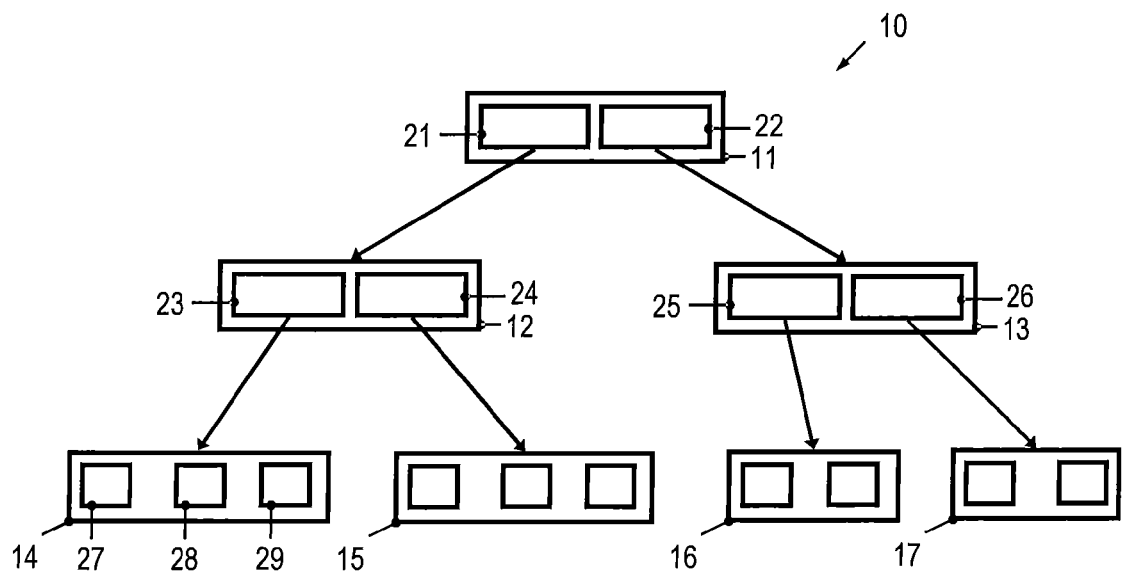
FIG. 2 is a schematic representation of an example index structure.

FIG. 2 is a schematic representation of an example index structure 10. While shown as a tree-like structure in FIG. 2, the index structure may generally be stored in any suitable format, for example as a user-defined index structure in a relational data base.

The index structure includes directory nodes 11, 12, 13 and leaf nodes 14, 15, 16, 17. Each one of the directory nodes 11, 12, 13 includes pointers to other nodes. Each pointer may respectively be associated with an object included in the respective node. For example, the root node 11 may include a data entry 21 associated with a first object and a data entry 22 associated with a second object. The data entry 21 may include a pointer to the directory node 12, which is the root of the sub-tree of the first object. The data entry 22 may include a pointer to the directory node 13, which is the root of the sub-tree of the second object.

The directory node 12 may include data entries 23, 24 associated with other objects of the data base. The data entries 23, 24 may respectively include a pointer to another node. In the example structure illustrated in FIG. 2, the data entries 23, 24 include pointers to leaf nodes 14 and 15, respectively. A larger hierarchy of directory nodes may be implemented. Similarly, the directory node 13 may include data entries 25, 26 associated with other objects of the data base. The data entries 25, 26 may respectively include a pointer to another node, such as leaf nodes 16 and 17, respectively.

The leaf nodes 14, 15, 16, 17 may respectively include data entries associated with one or plural objects of the data base. For example, leaf node 14 is shown to include data entries 27, 28, 29 associated with three objects of the data base.

In the index structure, the search tree may be partitioned in accordance with the distance metric. To this end, the first object represented by data 21 and the second object represented by data 22 may be selected such that all objects included in the first sub-tree with root node 12 are located within a coverage area having a first coverage radius about the first object, and all objects included in the second sub-tree with root node 13 are located within a coverage area having a second coverage radius about the second object. In other words, the first coverage radius may be the maximum of the distances between any object represented by any one of nodes 12, 14 and 15 from the object represented by data entry 21, which is the parent of this sub-tree. The second coverage radius may be the maximum of the distances between any object represented by any one of nodes 13, 16 and 17 from the object represented by data entry 22, which is the parent of this sub-tree.

The first object and the second object in the root node 11, and the objects in the associated sub-trees, are selected such that the first and second coverage areas have an overlap which, preferably, is as small as possible. Further, the first object and the second object in the root node 11 and the objects in the associated sub-trees may be selected such that a first maximum distance between the first object and any object included in the sub-tree with root 12 and a second maximum distance between the second object and any object included in the sub-tree with root 13 remains as small as possible. The index structure is thus partitioned in accordance with proximity between objects determined according to the distance metric.

The criteria outlined for organizing the index structure above not only apply to the root node 11, but also apply to any directory node 12, 13. For example, objects may be organized into directory and leaf nodes with the aim of reducing the overlap of coverage areas of different objects in the directory node, and with the further aim of reducing the size of the coverage areas. A systematic approach for generating such an index structure will be described later with reference to FIGS. 10-12.

In some embodiments, directory nodes of the index structure may include information on distances between objects included in the index structure. The data entries 21-26 in directory nodes may respectively include an upper bound on the distance between the object and any object included in the sub-tree to which this object points. The upper bound may be the maximum of these distances. For example, the data entry 21 may include an upper bound on the distance between the first object represented by data entry 21 and any object in nodes 12, 14 and 15. The data entry 22 may include an upper bound on the distance between the second object represented by data entry 22 and any object in nodes 13, 16 and 17. The data entry 23 may include an upper bound on the distance between the object represented by data 23 and any one of the objects in node 14. Based on this upper bound, pruning may be performed during the similarity search.

The data in nodes which have a parent object may further include, for any object in the respective node, information on a distance between the object and its parent object. This information may also be used for estimating distances in the similarity search.

The index structure may in particular be organized as an M-tree as developed by P. Ciaccia, M. Patella and P. Zezula. Other index structures which are organized in accordance with a distance metric may also be used. For example, the index structure may be a vantage-point tree, or any other index structure organization.

Figures 3, 4, 5:
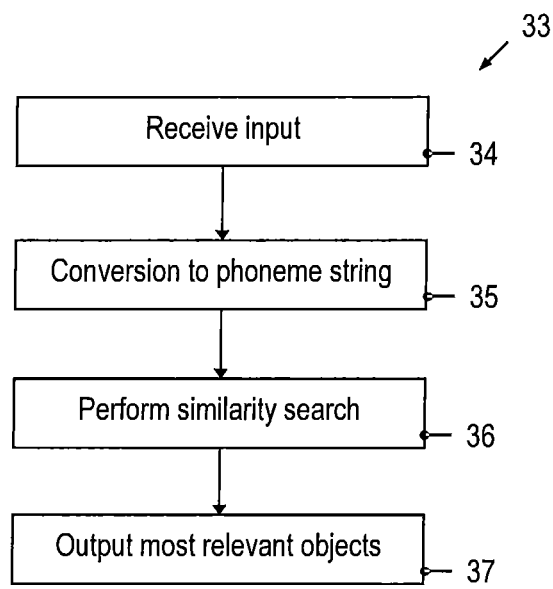
FIGS. 3 and 4 are example schematic representations of data entries in nodes of the index structure.
FIG. 5 is a flow chart of an example method which uses a similarity search.

FIG. 3 shows an exemplary data structure for a data entry 31 associated with an object included in a directory node. The example data entry 31 may be used in an M-tree. The data entry 31 includes the object $O_r$. Alternatively, feature values of the object may be included in the data entry 31. Alternatively, an identifier of the object may be included in the data entry 31. The data entry 31 may further include a pointer $ptr(T(O_r))$ to the root node of the sub-tree for the object $O_r$. If the directory node is not the root node of the index structure, the data entry 31 may further include the distance $d(O_r; P(O_r))$ between the object $O_r$ and its parent object $P(O_r)$. By including such distances into the index structure, the value $d(O_r; P(O_r))$ may be used for estimating distances and/or for pruning the search. The efficiency of the similarity search can be enhanced at run time.

The data entry 31 may further include a radius $r(O_r)$ which is a predetermined upper bound on the distances between the object $O_r$ and any object in the sub-tree having the root node $T(O_r)$. The radius $r(O_r)$ may be defined to be the maximum of such distances:

$$r(O_r) = \max_j d(O_j; O_r), \qquad (5)$$

where the maximum is determined over all object in the sub-tree to which the pointer $ptr(T(O_r))$ points.

FIG. 4 shows an exemplary data structure for the data entry 32 associated with an object included in a leaf node of the index structure. Although any tree structure may be used, data entry as used in an M-tree is illustrated in FIG. 4. The data entry 32 includes indication of an object $O_j$. Alternatively, or in addition, feature values of the object may be included in the data entry 32. Alternatively, an identifier of the object may be included in the data entry 32.

The data entry 32 may further include the distance $d(O_j; P(O_j))$ between the respective object and its parent object $P(O_j)$. By including such distances into the index structure, the value $d(O_j; P(O_j))$ may be used for estimating distances and/or for pruning the search without requiring the distance to be computed during the search.

Other data structures may be used. For example, the various fields entries indicated in the data entry 31 or the data entry 32 do not need to be stored in proximity to each other. A user-defined index structure in a relational data base may be used for storage of the index structure.

FIG. 5 is a flow chart of an example method 33 which may be performed by the processor 2, using the index structure. At step 34, an input is received. The input may be a user input received via input interface 5. Alternatively, the input may be provided to the processor 2 by other systems or devices of the vehicle or may be received from outside of the vehicle. The input may be a text string. At step 35, a text-to-phoneme conversion is performed. The resulting phoneme string serves as a query object.

At step 36, a similarity search is performed using the index structure. The index structure is a metric index structure organized in accordance with a distance metric. The index structure may be configured as described with reference to FIGS. 2-4 above. To perform the similarity search, distances between the query object and objects in the index structure are determined according to the distance metric. At step 37, the most relevant objects found in the search are output. The most relevant objects may be the k>1 nearest neighbours of the query object, i.e. the k objects having the smallest distances from the query object among the indexed objects, the distances being determined according to the distance metric. The most relevant objects may alternatively be all objects in the index structure which have a distance from the query object which is less than a predetermined threshold. The outputting at step 37 may be performed such that plural objects are output. The objects may be output in an order determined by their respective distance from the query object.

Figure 6:
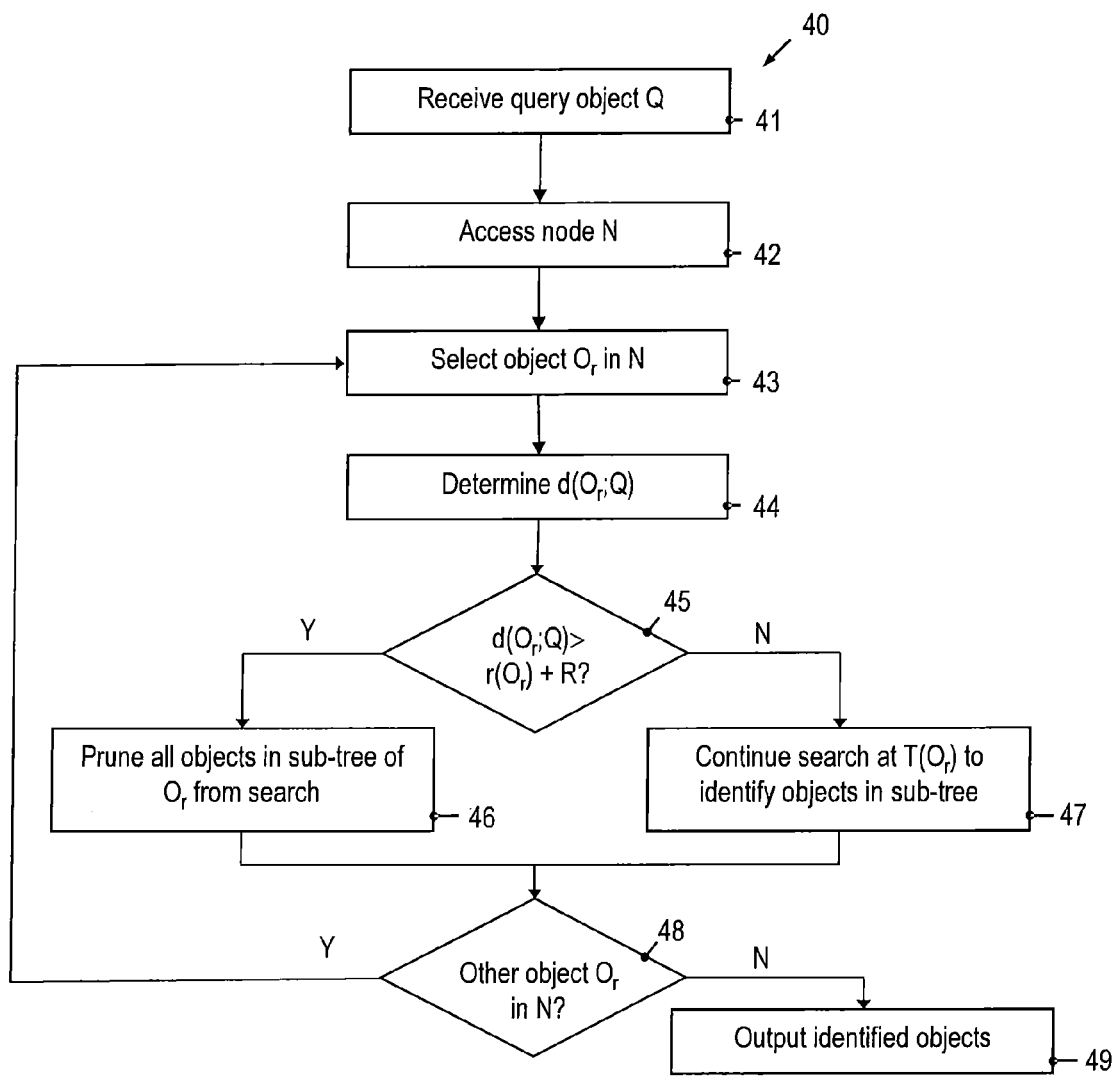
FIG. 6 is a flow chart of an example method of performing a similarity search.

FIG. 6 is a flow chart of an example method 40 for performing a similarity search. The method 40 may be performed by the processor 2. The similarity search is performed using a index structure which is organized in accordance with a distance metric $d(\bullet; \bullet)$. Depending on the type of objects, any one of a variety of distance metrics may be selected as described above. The index structure may be configured as described with reference to FIGS. 2-4.

At step 41, a query object (Q) is received. Receiving the query object may include processing of an input, such as performing a text-to-phoneme conversion. At step 42, a node N of the index structure is accessed. Steps of the method 40 may be repeated iteratively along a path through the tree. In the first iteration, the node N may be the root node of the index structure. In a subsequent iteration, the node N may be a directory node of the index structure.

At step 43, an object $O_r$ in the node N is selected. Different objects $O_r$ may be selected in the order in which they are included in the node N. At step 44, a distance $d(O_r; Q)$ between the query object Q and the selected object $O_r$ in the node N is determined. For text or phoneme strings, determining the distance may include computing a Levenshtein distance or the distance according to any other string metric. The distance at step 44 may be determined using the distance metric according to which the index structure is partitioned. At step 45, it is determined whether the distance $d(O_r; Q)$ is greater than the sum of the coverage radius $r(O_r)$ of object Or and a search radius R. The search radius R may be a fixed predetermined radius. Alternatively, the search radius R may also be dynamically adjusted as the similarity search continues. For example, the search radius R may be adjusted in a k nearest neighbour search such that R corresponds to the distance between the query object and the $k^{th}$ nearest neighbour retrieved so far.

If it is determined that the distance $d(O_r; Q)$ is greater than the sum of the coverage radius $r(O_r)$ and the search radius R, the method proceeds from step 45 to step 46. At step 46, all of the objects in the sub-tree for object $O_r$ are pruned from the search. By virtue of the definition of the coverage radius $r(O_r)$ as being an upper bound of the distances between any object in that sub-tree and the object $O_r$, no object in the sub-tree for object $O_r$ can have a distance of less than or equal to the search radius R from the query object Q if the distance $d(O_r; Q)$ is greater than the sum of $r(O_r)$ and R. By pruning the search, spurious search steps may be avoided.

If it is determined that the distance $d(O_r; Q)$ is not greater than the sum of the coverage radius $r(O_r)$ and R, the method proceeds from step 45 to step 47. At step 47, the search is continued in the sub-tree for object $O_r$. To this end, the root node $T(O_r)$ of the sub-tree for object $O_r$ is accessed. The root node is selectively accessed based upon the condition tested at step 45. To continue the search in this sub-tree, the steps 42-48 may be repeated within the sub-tree until a leaf node is reached. A leaf node is reached if, along the path from the root of the index structure to the leaf node, the condition examined at step 45 has not been fulfilled for any object $O_r$ traversed along this path. If a leaf node is reached at step 47, the distance $d(O_j; Q)$ between objects $O_j$ in the leaf node and the query object Q may be determined. If $$d(O_j; Q) < R, \qquad (6)$$

the object $O_j$ may be included in a list of relevant indexed objects for subsequent outputting. If a k nearest neighbour search is performed, the search radius R may be updated, i.e., may be reduced, if Equation (6) is fulfilled and the object $O_j$ is included in the list of relevant objects identified in the index structure. If no object is found in the leaf node for which Equation (6) is fulfilled, the method proceeds to step 48.

At step 48, it is determined whether there is another object $O_r$ in the node N. If there is another object, the method returns to step 43, where another one of the objects $O_r$ is selected. If it is determined that there is no other object in node N, the method proceeds to step 49. At step 49, the identified objects are output. The outputting may be performed such that plural objects are output. The objects found in the similarity search may be output in an order determined by their respective distance from the query object Q. As this distance has previously been determined at step 44 or step 47, the distance can be used to organize the identified objects in an ordered list for subsequent outputting. Alternatively, the distance determined during the search may be registered for subsequent sorting of the objects in accordance with their distance from the query object Q.

In the example method 40, the similarity search may be performed based on distances between the query object and indexed objects. This allows the search to be performed even when the query object and indexed objects are not defined in a Euclidean space. The similarity search 40 may also be performed for objects defined in a multi-dimensional vector space. A fault-tolerant search is implemented using the similarity search in the metric index structure.

In the method, the search may be selectively pruned based on distances between the query object and objects of the index structure. Pruning may be done base on the condition verified in step 45 of the method 40 or based on alternative or additional conditions described later.

Figure 7:
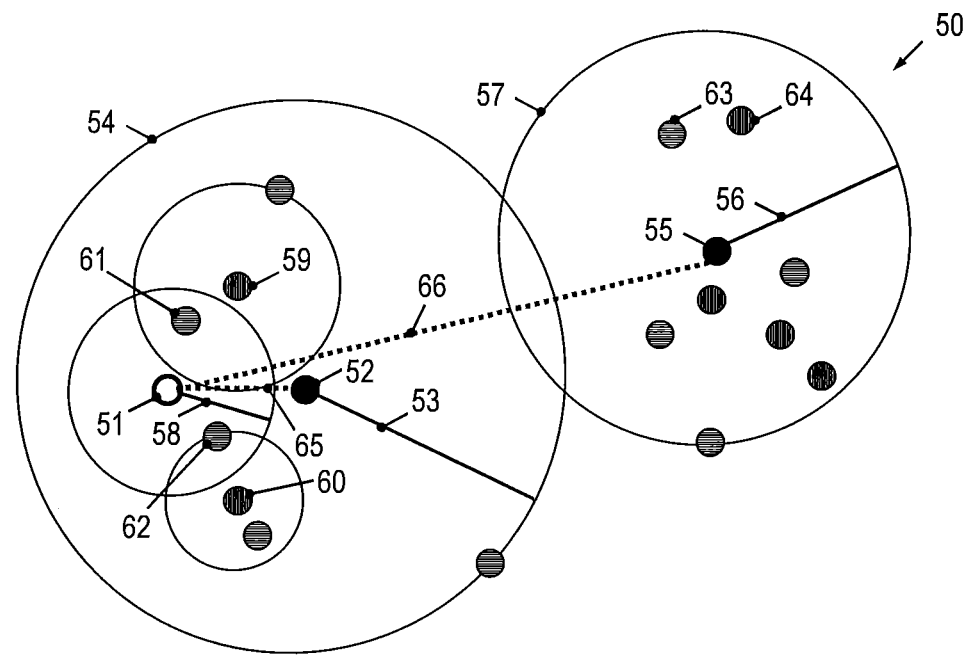
FIG. 7 is a schematic representation of example data base, objects for explaining the method of FIG. 6.

Another example of operation of the data base system is described with reference to FIG. 7 and FIG. 8. FIG. 7 is an example schematic representation 50 of objects and FIG. 8 is an example schematic representation of an index structure 70.

The objects shown in FIG. 7 include objects 52 and 55 which are included in the root node of the index structure. Objects which are located in the sub-tree for object 52 are located at distances of less than or equal to a coverage radius 53 from object 52. Objects which are located in the sub-tree for object 53 are located at distances of less than or equal to a coverage radius 56 from object 55. As schematically illustrated, objects in the sub-tree for object 52 are located in a first coverage area 54. Objects in the sub-tree for object 55 are located in a second coverage area 57. The index structure is organized such that the coverage areas 54 and 57 have a small overlap. Objects in the sub-tree associated with the object 52 are clustered around object 52, and objects in the sub-tree associated with the object 55 are clustered around object 55.

The root node of the sub-tree for object 52 includes objects 59 and 60. The node including objects 59 and 60 is a directory node. A pointer associated with object 59 points to a leaf node which includes objects in proximity to object 59, such as object 61. A pointer associated with object 60 points to a leaf node which includes objects in proximity to object 60, such as object 62. Objects 63, 64 may be included in a sub-tree associated with object 55.

Figure 8:
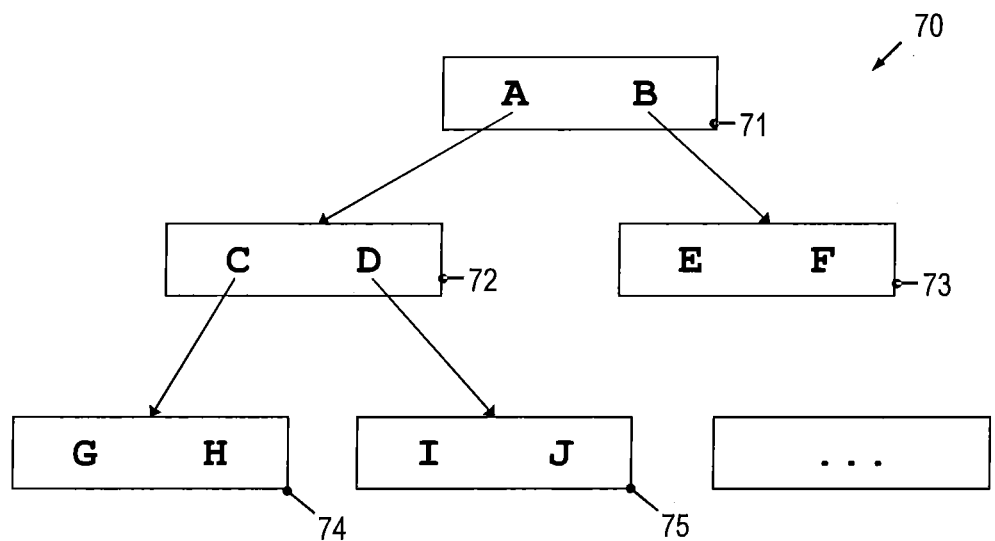
FIG. 8 is a schematic representation of an example index structure for explaining the method of FIG. 6.

FIG. 8 illustrates an example index structure 70 which corresponds to the representation of FIG. 7. In FIG. 8, objects are labelled as A, B, C, D, E, F, G, H, I, J. The index structure includes a root node 71 with objects A and B. Object A in the root node 71 corresponds, for example, to the object indicated at 52 in FIG. 7. Object B in the root node 71 corresponds, for example, to the object indicated at 55 in FIG. 7. The index structure includes a directory node 72 which is the root node for the sub-tree associated with object A. The node 72 includes objects C and D. Object C in node 72 corresponds, for example, to the object indicated at 59 in FIG. 7. Object D in node 72 corresponds, for example, to the object indicated at 60 in FIG. 7.

The index structure includes a leaf node 74 which has object C as parent node. The node 74 includes objects G and H. Object G in node 74 corresponds, for example, to the object indicated at 61 in FIG. 7. The index structure includes a leaf node 75 which has object D as parent node. The node 75 includes objects I and J. Object I in node 75 corresponds, for example, to the object indicated at 62 in FIG. 7. The index structure includes additional nodes 73 in the sub-tree associated with object B.

Assuming, for example, that a proximity search is to be performed for a query object 51, the search may be pruned using distances between the query object and the respective objects A-J in the index in combination with distance information included in the index structure. An example search radius R is schematically indicated at 58 in FIG. 7. When the search method 40 is started, the root node 71 of the index structure is accessed. The distance d(Q; B) between the query object Q and object B shown at 66 is greater than the sum of the search radius 58 and the coverage radius 56. Therefore, no search is performed in the sub-tree for object B.

The distance d(Q; A) between the query object Q and object A shown at 65 is less than the sum of the search radius indicated at 58 and the coverage radius for object A indicated at 53. Therefore, the search is continued in the sub-tree for object A. By repeating steps 42-49 of the method 40 (FIG. 6) for the sub-tree having root node 72, the objects G (represented by symbol 61 in FIG. 7) and I (represented by symbol 62 in FIG. 7) may be identified, which are located at a distance of less than or equal to the search radius from the query object 51.

By identifying these objects, a fault-tolerant search is implemented which returns the objects which have least dissimilarity, measured according to the distance metric, from the query object. The similarity search may be performed efficiently by pruning the search based on the coverage radius. Additional data included in the index structure may be used to further enhance search efficiency. For example, if the distance between objects and their respective parent objects is stored in the index structure, this information may be used to reduce the number of distance computations that need to be performed at run-time.

For example, in FIG. 6, when the node N accessed at step 42 of the method 40 is a directory node which is not the root node of the index structure, steps 44-47 may be selectively performed only if $$|d(Q;P(O_r))-d(O_r;P(O_r))| \le r(O_r)+R, \quad (7)$$

where $P(O_r)$ denotes the parent of node object $O_r$. With the distance d( , ) being a metric, the triangle inequality ensures that no object in the sub-tree for object $O_r$ has a distance of R or less from the query object Q if Equation (7) is not fulfilled. If Equation (7) is not fulfilled, the sub-tree for object $O_r$ may be pruned.

Equation (7) can be verified without requiring any additional distance computations. The quantity $d(Q; P(O_r))$ was determined in a preceding iteration of the method 40 for the parent node. The quantity $d(O_r; P(O_r))$ can be read from the index structure. By performing the computation at step 44 of the method 40 selectively depending on whether the condition of Equation (7) is fulfilled, the number of computationally costly distance determinations at run-time may be reduced.

As a further example, when a leaf node is accessed at step 47 of the method 40, the distance between an object $O_j$ in the leaf node and the query object Q may be selectively determined only if $$|d(Q;P(O_j)) - d(O_j;P(O_j))| \leq R, \qquad (8)$$

where $P(O_j)$ denotes the parent of the leaf node in which object $O_j$ is included. As $d(\ ,\ )$ is a metric, the triangle inequality ensures that $O_j$ and the query object Q cannot have a distance of R or less if Equation (8) is not fulfilled. If Equation (8) is not fulfilled, it is not required to determine $d(Q; O_j)$.

Equation (8) can be verified without requiring any additional distance computations. The quantity $d(Q; P(O_j))$ was determined in a preceding step of the method 40 for the parent node. The quantity $d(O_j; P(O_j))$ can be read from the index structure. By computing $d(Q; P(O_j))$ selectively only if the condition of Equation (8) is fulfilled, the number of computationally costly distance determinations at run-time may be reduced.

The data base system may use the described devices and methods for performing a similarity search according to embodiments described with reference to FIGS. 1-8 above may be used when the objects are textual strings, phoneme strings or multimedia objects. The devices and methods may be used to identify objects in the index structure which have the smallest dissimilarity from a phoneme string. The index structure may be used as a filter for the phoneme string.

Figure 9:
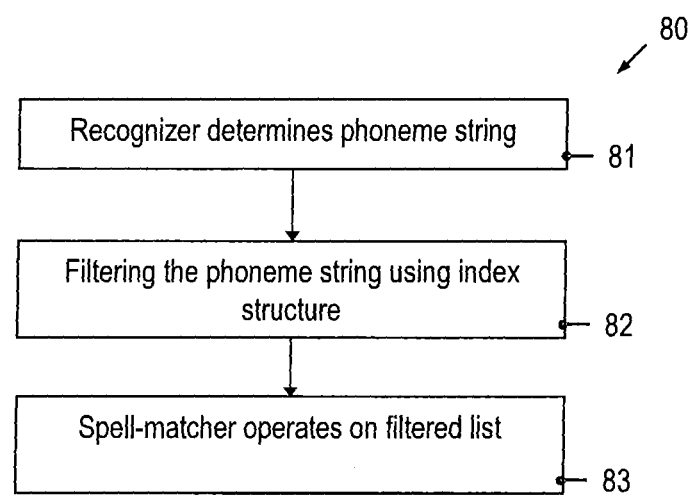
FIG. 9 is a flow chart of an example method which uses a similarity search.

FIG. 9 is an example flow chart representation of a method 80 in which the similarity search may be used. At step 81, a recognizer determines a phoneme string based on an input. The input max be a textual string. The conversion to a phoneme string may be based on different phoneme clusters corresponding to phonemes that are similar to each other in the sense that the distance between phonemes in a cluster, determined using the distance metric, is below a predetermined threshold.

At step 82, the phoneme string is filtered using the index structure. The phoneme string may be filtered by performing a similarity search in the index structure as described with reference to any one of FIGS. 1-8. In some example implementations, objects having a distance from the query object of less than or equal to a threshold may be determined. In alternative implementations, the k nearest neighbour objects of the query object may be determined. At step 83, the results of the phoneme filtering is provided to a spell-matcher.

Figure 10:
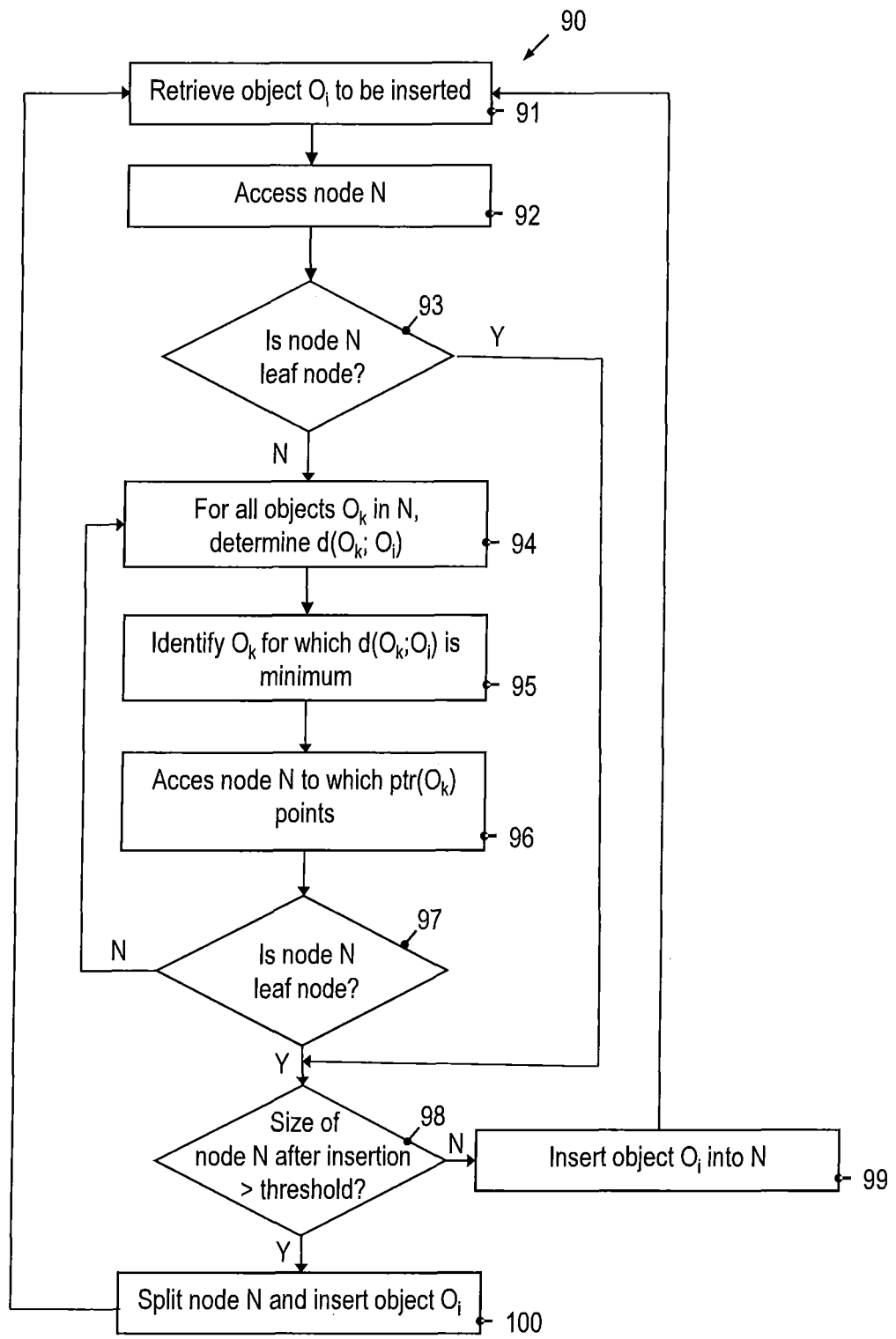
FIG. 10 is a flow chart of an example method of generating an index structure.
Figure 11:
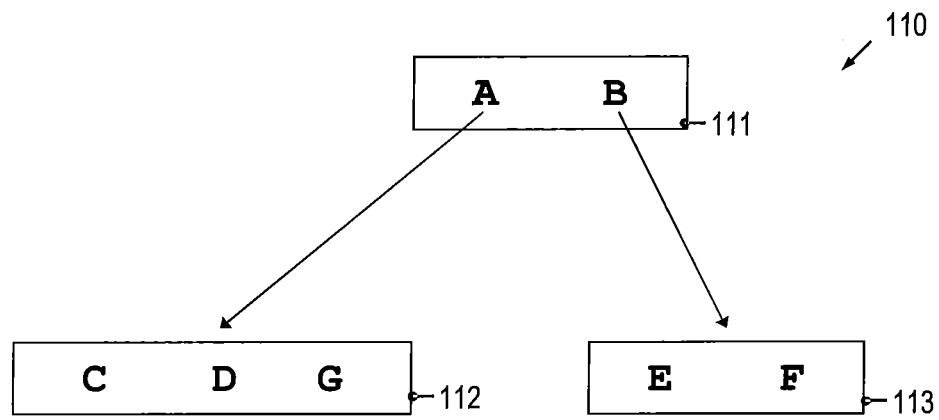
FIGS. 11 and 12 are schematic representations of an example index structure for explaining the method of FIG. 10.
Figure 12:
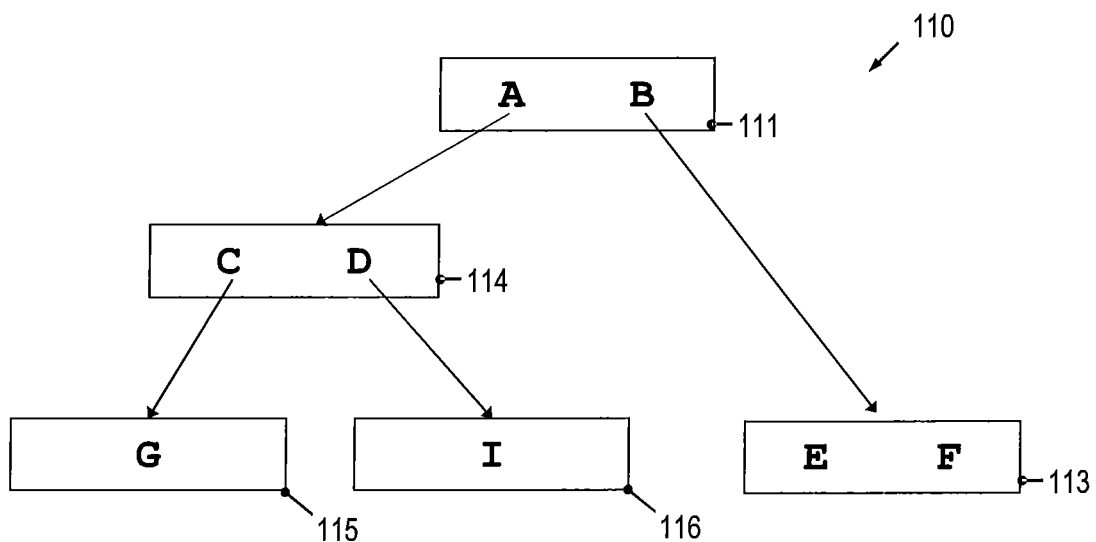

In the data base system, in some examples, the index structure may be a metric index structure. In addition, in some examples the index structure may correspond to a balanced search tree. Further, in some examples the index structure may be configured such that the number of entries per directory node and per leaf node is fixed. With reference to FIGS. 10-12, the data base system may execute a method of generating an index structure having these properties.

FIG. 10 is an example flow chart of a method 90 performed by the database system for generating an index structure. The method 90 may be performed separately from the similarity search. For example, the method 90 may be performed when pre-processing data for a navigation device. In some examples, the index structure may be built at a central site by a server computer and may then be deployed to plural navigation devices. In other examples, the index structure may be built in the navigation device, in the vehicle, in a user computer, or in any other location.

The method 90 may build the index structure in a bottom-up fashion, with additional objects being subsequently added to the index structure. In some examples, the index structure may be built using the distance metric that can subsequently also be used when performing a similarity search. The additional objects inserted may be strings, in particular phoneme strings or text strings.

In the method 90, the index structure may be built by inserting objects and by splitting nodes when an overflow condition occurs in a node. When a node is split, a new directory node may be generated. At step 91, an object $O_i$ that is to be inserted into the index structure is retrieved. The object may be a phoneme string or text string. At step 92, a node N of the index structure is accessed. If there is only one node, this node is accessed. If the index structure already includes a directory node, the highest directory node, i.e., the root node of the structure, is accessed. At step 93, it is determined whether the node N is a leaf node. If the node is a leaf node, the method continues at step 98. Otherwise, the method continues at step 94.

At 94, the distance $d(O_k; O_i)$ is determined between the object $O_i$ to be inserted and all objects $O_k$ included in the node. The distance is respectively determined according to the distance metric.

At step 95, the object $O_k$ included in node N is determined for which $d(O_k; O_i)$ is minimum. At step 96, a new node N is selected, which is the root node of the sub-tree for object $O_k$. The node N is accessed. At step 97, it is determined whether the node N is a leaf node. If the node N is not a leaf node, the method returns to step 94. Otherwise, the method continues at step 98. At step 98, it is determined whether the size of the node N after insertion of the object would exceed a predetermined threshold which corresponds to the maximum allowed number of entries of a node. If it is determined that the maximum allowed number of entries would not be exceeded, the object $O_i$ is inserted into the node at step 99. The method then returns to step 91.

If it is determined at step 98 that the node N already has the maximum allowed number of entries, the method continues at step 99. At step 99, the node N is split into a pair of nodes. By splitting the node N, two new leaf nodes are generated. At substantially the same time, a directory node is generated which includes two objects with pointers to the two new leaf nodes. The object $O_i$ may be inserted into one of the two new leaf nodes or into the new directory node. The method then returns to step 91.

FIGS. 11 and 12 illustrate an example of splitting a leaf node when the maximum allowed number of entries in the leaf node is reached. FIG. 11 shows an index structure 110 having a directory node 111 with objects A and B, a leaf node 112 with objects C, D, G, and another leaf node 113 with objects E and F. Assuming that a new object I is inserted for which $d(A; I) < d(B; I)$, the method 90 determines that the object is to be inserted in a leaf node which can be reached starting from node A. In the example where the maximum number of entries permitted for a node corresponds to three objects, the object cannot be simply inserted into node 112. In this case, the node 112 is split.

FIG. 12 shows an example of the index structure 110 after node 112 has been split. Two new leaf nodes 115 and 116 are generated. Further, a new directory node 114 is generated. The objects C and D included in the leaf node 112 are promoted to objects in a directory node. In an example of M-tree terminology, the objects C and D are promoted to routing objects. Object G is added to the leaf node 115 having object C as parent. Object I is added to the leaf node 116 having object D as parent.

When a node is split at step 100 in the method 90, various techniques may be used to select the objects which are promoted to the directory node. For example, for M-trees, the following implementations may be used:

In one example implementation, the objects promoted to the directory node may be selected randomly.

In another example implementation, a sampling is performed over plural pairs of objects promoted to the directory node. For any one of the plural pairs, the other objects included in the node are partitioned into the two new leaf nodes. Objects may be assigned to the one of the new leaf nodes for which the distance between the object and the parent of the leaf node is smaller. When the partitioning is complete, the resulting covering radii are determined. The covering radii are determined according to Equation (5). For different pairs of objects promoted to the directory node, different covering radii result. The node may then be split such that the one of the sampled pairs of objects is added to the directory node for which the maximum of the two covering radii has the minimum value among the sampled pairs of promoted objects.

In another example implementation, a sampling is performed over all possible pairs of objects $O_1$ and $O_2$ which are included in the node and could in principle be added to the directory node. The other objects included in the node prior to splitting are partitioned as previously described. For example, the objects may be assigned to the one of the new leaf nodes for which the distance between the object and the parent of the leaf node is smaller. For any one of the possible pairs of objects, the sum of the covering radii $r(O_1)+r(O_2)$ may be determined. The pair of objects which leads to minimum sum of the covering radii may then be added to the directory node. The other objects may respectively be assigned to the one of the new leaf nodes for which the distance between the object and the parent of the leaf node is smaller.

In another example implementation, a sampling is performed over all possible pairs of objects $O_1$ and $O_2$ which are included in the node and could in principle be added to the directory node. The other objects included in the node prior to splitting are partitioned as described above. For example, the objects may be assigned to the one of the new leaf nodes for which the distance between the object and the parent of the leaf node is smaller. For any one of the possible pairs of objects to be promoted, the maximum of the two covering radii, $\max(r(O_1), r(O_2))$ is determined. The pair of objects which leads to a minimum value for the maximum of the covering radii may then be added to the directory node. The other objects may respectively be assigned to the one of the new leaf nodes for which the distance between the object and the parent of the leaf node is respectively smaller.

In another example implementation, the object $O_k$ in the leaf node which has the greatest distance $d(O_k; O_i)$ from the object to be inserted is determined. This object $O_k$ and the new object $O_i$ may then be promoted to the directory node. The other objects may respectively be assigned to the one of the new leaf nodes for which the distance between the object and the parent of the leaf node is smaller.

While a method of data base system for generating an index structure configured as M-tree has been described with reference to FIGS. 10-12, other metric index structures and methods for building the same may be used in other examples. For example, a vantage-point tree may be used.

While devices and methods according to embodiments have been described in detail, modifications may be implemented in other examples. For example, while distance information such as covering radii or distances between parent and child objects may be stored in the index data, such data may also be computed at run-time. In addition, while exemplary structures of index trees and their nodes have been explained, any suitable data structure may be used to implement the index tree. For example, the index tree may be stored as a user-defined index structure in a relational data base. In this case, one table may be provided which includes textual strings or phoneme strings. Another table may be provided, which includes distances between pairs of the textual strings or phoneme strings.

Further, while index structures have been described using a wording such as "object in the index structure", the objects as such do not need to be incorporated into the index structure. Rather, the index structure may include an identifier or pointer to the object rather than the object itself. Also, while a similarity search has been described in the context of searches for objects located within a fixed search radius from a query object or in the context of searches for k nearest neighbours, other similarity searches may also be implemented using the metric index structure. While some searches have been described in the context of specific distance metrics or specific applications, such as the search for phoneme or text strings, the operation of the data base system is not so limited.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of performing a similarity search in a navigation device database using an index structure, the database including a plurality of objects and the index structure including a plurality of nodes, the method comprising:
  receiving a query object at one of a vehicle interface and an input interface of a navigation device, the navigation device further comprising a storage device storing the index structure;
  accessing a first node of the index structure that includes at least one object of the plurality of objects, wherein the plurality of objects stored in the database comprise a plurality of phoneme strings, and the plurality of nodes included in the index structure comprise leaf nodes respectively associated with at least one phoneme string, wherein the index structure further includes a distance information on distances between the at least one object and other objects of the index structure, wherein the first node is associated with a plurality of objects, wherein the distance information has stored therein, for each of the plurality of objects, a coverage radius that defines an upper bound on distances between a respective one of the plurality of objects and any object included in a sub-tree of the index structure associated with the respective one of the plurality of objects;
  for each of the at least one object included in the first node, determining a respective distance between the query object and the object, the distance being determined in accordance with a distance metric;
  determining, for each of the plurality of objects, whether the distance between the query object and the respective object is less than a sum of a fixed predetermined search radius and the coverage radius of the respective object stored in the first node of the index structure; and selectively accessing a second node of the index structure based on the distance information and the determined distances.

2. The method of claim 1, wherein the query object is one of a phoneme string and a textual string.

3. The method of claim 2, wherein receiving the query object includes receiving a text input and performing a text-to-phoneme conversion.

4. The method of claim 1, wherein the query object is one of a phoneme string and a textual string, and wherein receiving the query object includes receiving a text input and performing a text-to-phoneme conversion, and wherein the distance metric is selected from a group consisting of: a Levenshtein distance, a Damerau-Levenshtein distance, a Jaro-Winkler distance, a Hamming distance, a Soundex distance metric, a Needleman-Wunsch distance, a Gotoh distance, and a Smith-Waterman-Gotoh distance.

5. The method of claim 1, further comprising selectively pruning objects from the similarity search based on the determined distances.

6. The method of claim 1, wherein determining a distance and selectively accessing the second node is terminated when the second node is a leaf node of the index structure.

7. The method of claim 1, further comprising identifying all objects located within a pre-determined distance from the query object according to the distance metric.

8. The method of claim 1, further comprising identifying an integer number k>1 of objects, which represent k nearest neighbors of the query object, the identified objects determined in accordance with the distance metric.

9. The method of claim 8, further comprising outputting the identified objects in an order determined based on a respective distance between the query object and each of the respective identified objects.

10. The method of claim 1, wherein the at least one object further comprises a multimedia object.

11. A navigation device, comprising:
a storage device storing an index structure for a database that includes a plurality of objects that comprise a plurality of phoneme strings, the index structure including a plurality of nodes, the plurality of nodes including leaf nodes respectively associated with at least one phoneme string; and
a processor coupled to the storage device and configured to perform a similarity search for a query object, wherein performing the similarity search comprises:
receiving the query object at one of a vehicle interface and an input interface of the navigation device;
accessing a first node of the index structure that includes at least one object of the plurality of objects;
determining a distance between the query object and the at least one object in accordance with a distance metric;
determining whether the distance is less than a sum of a fixed predetermined search radius and a coverage radius of the object that is stored in the index structure, the coverage radius stored in the index structure and representing an upper bound on a distance between the object and any object included in a sub-tree of the index structure associated with the object;
searching the sub-tree associated with the object; and
selectively accessing a second node of the index structure based on the determined distance.

12. The navigation system of claim 11, wherein the processor is further configured to prune from the similarity search a plurality of objects included in the subtree of the object based on whether the distance is greater than the sum of the fixed predetermined search radius and the coverage radius of the object that is stored in the index structure.

13. The navigation system of claim 11, wherein the processor is further configured to identify all objects located within a pre-determined distance from the query object according to the distance metric, wherein the distance metric is selected from a group consisting of: a Levenshtein distance, a Damerau-Levenshtein distance, a Jaro-Winkler distance, a Hamming distance, a Soundex distance metric, a Needleman-Wunsch distance, a Gotoh distance, and a Smith-Waterman-Gotoh distance.

14. The navigation system of claim 11, wherein the processor is further configured to identify an integer number k>1 of objects, which represent k nearest neighbors of the query object, the identified objects determined in accordance with the distance metric, wherein the distance metric is selected from a group consisting of: a Levenshtein distance, a Damerau-Levenshtein distance, a Jaro-Winkler distance, a Hamming distance, a Soundex distance metric, a Needleman-Wunsch distance, a Gotoh distance, and a Smith-Waterman-Gotoh distance.

15. The navigation system of claim 14, wherein the processor is further configured to output the identified objects in an order determined based on a respective distance between the query object and each of the respective identified objects.

16. The navigation device of claim 11, wherein the at least one object is one of a phoneme string and a multimedia object.

17. A method of generating a metric index structure for a navigation device database that includes a plurality of objects, the method comprising:
generating, via a processor, directory nodes of the index structure that include a pointer to other nodes of the index structure; and
generating, via the processor, leaf nodes of the index structure, wherein the plurality of objects stored in the database comprise a plurality of phoneme strings, and at least a fraction of the directory nodes being associated with a phoneme string, wherein generating directory nodes and leaf nodes includes:
for two or more pairs of the objects, determining a respective distance between the objects of each pair according to a distance metric, and
identifying, based on the determined distances, objects that are included in a directory node and objects that are included in a leaf node;
storing distance information derived from the determined distances in at least one of the directory nodes or the leaf nodes, wherein the distance information stored for at least one of the directory nodes includes a coverage radius representing an upper bound on a distance between an object included in the directory node and any object included in a sub-tree of the index structure associated with the object; and
storing the index structure in a storage device of the navigation device, wherein the navigation device is further configured to perform a similarity search using the stored index structure in response to receiving a query object at one of a vehicle interface and an input interface of the navigation device.

18. The method of claim 17, where the objects are one of phoneme strings and textual strings, and wherein the distance metric is selected from a group consisting of: a Levenshtein distance, a Damerau-Levenshtein distance, a Jaro-Winkler distance, a Hamming distance, a Soundex distance metric, a Needleman-Wunsch distance, a Gotoh distance, and a Smith-Waterman-Gotoh distance.

19. The method of claim 17, wherein the plurality of objects comprises at least one of a phoneme string and a multimedia object.

* * * * *